J. G. SIMPSON.
WATER SEALED TRAP.
APPLICATION FILED MAY 22, 1913.
1,185,846.
Patented June 6, 1916.
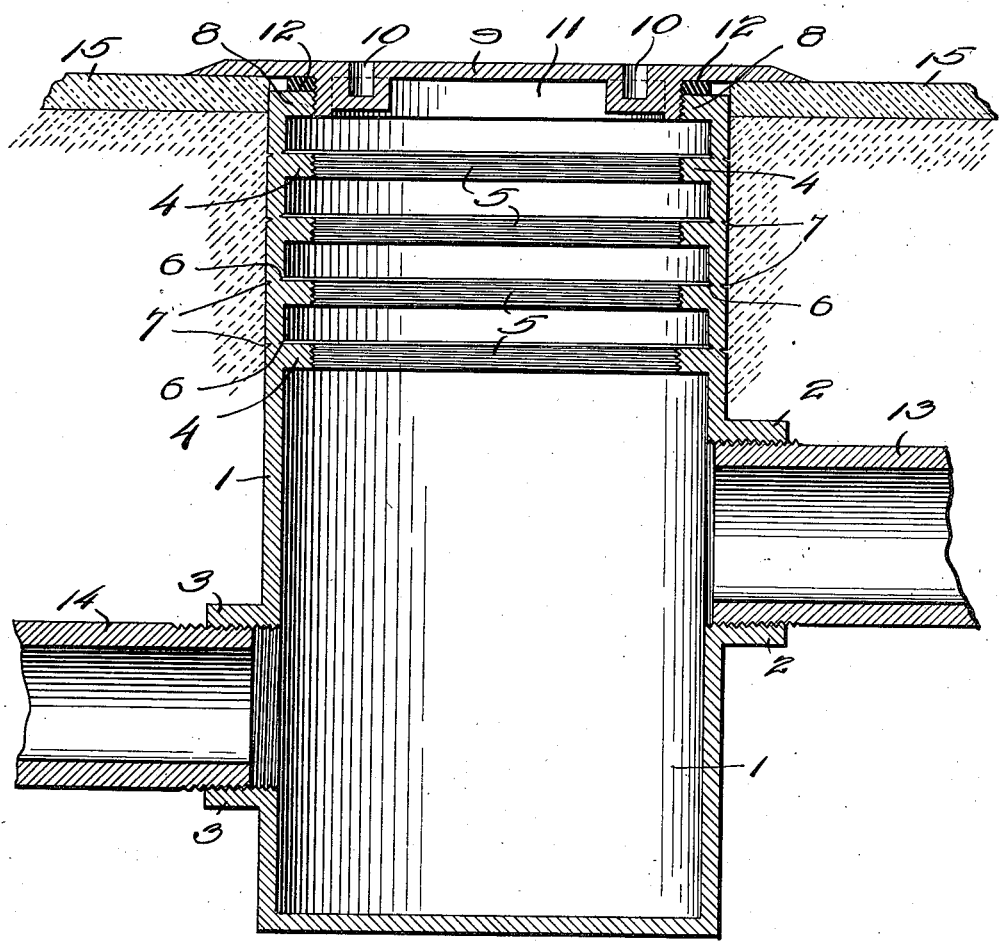
Witnesses
Inventor
J. G. Simpson.
By
his Attorney

UNITED STATES PATENT OFFICE.

JOHN G. SIMPSON, OF KNOXVILLE, TENNESSEE, ASSIGNOR TO FANNY H. SIMPSON, OF KNOXVILLE, TENNESSEE.

WATER-SEALED TRAP.

1,185,846.  Specification of Letters Patent.  Patented June 6, 1916.

Application filed May 22, 1913. Serial No. 769,246.

*To all whom it may concern:*

Be it known that I, JOHN G. SIMPSON, a citizen of the United States, residing at Knoxville, in the county of Knox and State of Tennessee, have invented certain new and useful Improvements in Water-Sealed Traps, of which the following is a specification.

This invention relates to water-sealed traps, and while capable of general application, is particularly designed to provide an improved bath trap to be included in the waste pipe connections with a bath tub.

In order that accumulations of waste matter may be conveniently removed from a bath trap, it is required that such traps be provided with removable covers which can be conveniently applied and removed. It is furthermore desirable that such traps be substantially flush with the upper surface of the floor so as to avoid undesirable obstructions.

Considerable difficulty is experienced, when setting a bath trap, in placing the trap so that its cover will be substantially flush with the upper surface of the floor, and in this connection it is an important object of the present invention to provide for the convenient cutting off of so much of the upper portion of the trap as may project above the floor after the trap has been set in place and connected with the waste pipe.

It is a further object of the invention to provide for the convenient fitting of the cover to the top of the trap at whatever point it may be cut off, and also to insure a gas-tight connection between the cover and the trap.

The present improvements do not in any manner whatsoever impair the ordinary or required functions of the trap, nor do they require any changes in the manner of connecting the trap with the waste pipe, and therefore it is another important object of the present invention to so construct the device as to enable the fitting of the trap to the waste pipe according to present universal practice.

With these and other objects in view, the present invention consists in the combination and arrangement of parts as will be hereinafter more fully described, shown in the accompanying drawing and particularly pointed out in the appended claims, it of course being understood that changes in the form, proportion, size and minor details may be made, within the scope of the claims, without departing from the spirit or sacrificing any of the advantages of the invention.

In the drawing, there has been illustrated a vertical sectional view of a water-sealed trap embodying the features of the present invention, wherein 1 designates the body of the trap, which is in the usual form of a cylindrical casing having an inlet nipple 2 and an outlet nipple 3.

Above the inlet 2, there is provided a series of internal annular flanges 4, spaced a suitable distance apart, for a purpose as will be hereinafter more fully described, and screw-threaded, as at 5, on their internal peripheries. Between adjacent flanges, the body of the trap is weakened, for instance, by means of an internal annular groove 6 and an external annular groove 7, said grooves extending entirely around the body of the trap and lying substantially in the same plane with the upper surface of the adjacent flange 4. While internal and external grooves have been illustrated, it is, of course, apparent that a single groove might be employed, either externally or internally, as may be desired, as the object of the grooves is to reduce the thickness of the annular wall of the trap body or casing so as to facilitate the cutting off of the trap body at the weakened point by the use of a chisel or other suitable implement.

The top of the trap is open and provided with an internal annular flange 8 having the same internal diameter as each of the flanges 4, and likewise internally threaded. The removable top or cover 9 of the trap is a flat disk, provided with a pair of spanner sockets or recesses 10. On the under side of the cover there is a depending cylindrical flange 11 which is externally threaded to fit the internally threaded top flange 8 of the body of the trap. The cover has a diameter somewhat in excess of the external diameter of the body of the trap, and a suitable gasket 12 is interposed between the flange 8 and the cover so as to insure a gas-tight fit of the latter when it has been screwed down snugly upon the top of the cap.

In practice, the trap is fitted in place in the usual way and is suitably connected to the waste pipe sections 13 and 14, with the upper portion of the trap projecting through an opening in the floor 15. After the trap has been connected with the waste pipe sections, it may be found that the upper portion of the trap projects above the floor, in which event the projecting portion is cut off at that weakened portion which is adjacent the upper surface of the floor, thereby exposing one of the flanges 4, to which the cover 9 may be conveniently screwed. It will here be noted that each flange 4 has a width corresponding to that of the top flange 8, so that each flange 4 constitutes a seat for the gasket 12, when the cover is fitted to any particular flange 4.

From the foregoing description, it will be apparent that the present invention preserves all of the necessary and desirable features of the common or ordinary water-sealed trap, and at the same time permits of the trap being conveniently set in place with its top or cover flush with the upper surface of the floor through which access must be had to the trap. It will be further noted that this invention preserves the threaded connection between the cover and the trap, in accordance with universal sanitary requirements.

By preference, the external diameter of the gasket, when not compressed, is substantially that of the interior of the body of the trap, and the internal diameter of the gasket is substantially the same as that of the respective flanges 8 and 4, so that when fitted in place, the gasket rests upon a flange without overlapping the upright wall of the body of the trap, and consequently the gasket will form a tight joint between the cover 9 and a flange, even though the upright wall of the body of the trap is not cut off exactly flush with the upper surface of the flange.

While the present disclosure illustrates and describes the invention as embodied in a water-sealed trap, it will, of course, be understood that it is of more general application, in that it may be used upon any casing or conduit where it is desired to cut off the end of the casing or conduit so as to have the same come substantially flush with a floor, wall or the like.

Having thus described the invention, what is claimed is:—

1. A device of the class described comprising a casing having an open top and a lateral inlet below the top of the casing, and a cover having a detachable connection with the casing, one of the elements of the detachable connection being upon the bottom of the cover and the other element of the connection being upon the interior of the casing, said casing having a series of connection elements located above the lateral inlet each of said elements being adapted to serve as a washer bearing when forming the uppermost connection, and said casing being weakened between successive connections to permit cutting off of the casing.

2. A device of the class described comprising a casing open at its top and provided with a lateral inlet below its open top, there being a series of internal annular flanges on the casing and above the lateral inlet each of said flanges being adapted to serve as a washer bearing when in uppermost position, said casing having annular weakened lines in substantially the planes of the upper faces of the flanges, and a removable cover having a depending connecting element for coöperation with the uppermost flange.

3. A trap casing having a series of internal annular flanges spaced apart to permit of the casing being cut off between adjacent flanges, said flanges being of the same internal diameter and internally screw threaded, and a removable cover having a depending cylindrical flange externally threaded to fit the internally threaded part of the uppermost flange of the casing.

4. A casing having a series of internal annular flanges spaced apart to permit of the casing being cut off between adjacent flanges, said flanges being of the same internal diameter and internally screw threaded, a removable cover having a depending cylindrical flange externally threaded to fit the internally threaded part of the uppermost flange of the casing, and a gasket to fit between the cover and the uppermost flange and having substantially the same internal diameter as that of the flanges and an external diameter substantially the same as the internal diameter of the body of the casing.

5. A device of the class described comprising a trap casing having an open top, a cover for said casing, a plurality of vertically spaced connecting means on the interior and at the upper part of said casing, connecting means on said cover for direct coöperation with the uppermost of the connecting means on the casing, the upper part of said casing being removable at desired points whereby a selected connecting means on the casing is brought into position for coöperation with the connecting means on said cover.

6. A device of the class described comprising a trap casing having an open top, a cover for said casing, a plurality of vertically spaced connecting means on the interior and at the upper part of said casing, connecting means on said cover for direct coöperation with the uppermost of the connecting means on the casing, the upper part of said casing being weakened at each connecting means whereby it may be removed to bring a selected connecting means into position for coöperation with the connecting means on said cover.

In testimony whereof I affix my signature in presence of two witnesses.

JOHN G. SIMPSON.

Witnesses:
   J. C. ROMINES,
   WILL WRIGHT.